United States Patent
Gohr (10) Patent No.: US 9,411,333 B2
(45) Date of Patent: Aug. 9, 2016

(54) METHOD AND TOOL FOR AUTOMATIC DISTRIBUTION OF CONTROL CODE IN A SAFETY SYSTEM

(71) Applicant: ABB AS, Billingstad (NO)

(72) Inventor: Katharina Gohr, Weinheim (DE)

(73) Assignee: ABB AS, Billingstad (NO)

( * ) Notice: Subject to any disclaimer, the term of this patent is extended or adjusted under 35 U.S.C. 154(b) by 818 days.

(21) Appl. No.: 13/717,181

(22) Filed: Dec. 17, 2012

(65) Prior Publication Data

US 2013/0131843 A1 May 23, 2013

Related U.S. Application Data

(63) Continuation of application No. PCT/EP2010/059036, filed on Jun. 24, 2010.

(51) Int. Cl.
| | |
|---|---|
| *G05B 9/02* | (2006.01) |
| *G05B 23/02* | (2006.01) |
| *G05B 19/042* | (2006.01) |
| *G06F 9/50* | (2006.01) |

(52) U.S. Cl.
CPC .......... *G05B 23/027* (2013.01); *G05B 19/0421* (2013.01); *G06F 9/505* (2013.01); *G05B 2219/25229* (2013.01); *G05B 2219/34355* (2013.01); *G06F 2209/5019* (2013.01)

(58) Field of Classification Search
CPC ... G05B 23/027; G05B 19/0421; G06F 9/505
USPC .......................................................... 700/80
See application file for complete search history.

(56) References Cited

U.S. PATENT DOCUMENTS

| 5,361,198 A | 11/1994 | Harmon et al. |
| 6,369,836 B1 * | 4/2002 | Larson ............... G05B 19/0426 715/763 |
| 6,448,982 B1 | 9/2002 | Klapper et al. |

(Continued)

FOREIGN PATENT DOCUMENTS

| EP | 0624824 A1 | 11/1994 |
| EP | 2053786 A2 | 4/2009 |
| WO | 2009089914 A1 | 7/2009 |

OTHER PUBLICATIONS

International Preliminary Report on Patentability Application No. PCT/EP2010/059036 Dated: Sep. 5, 2012 60 pages.

(Continued)

*Primary Examiner* — Robert Fennema
*Assistant Examiner* — Sivalingam Sivanesan
(74) *Attorney, Agent, or Firm* — Whitmyer IP Group LLC (57) ABSTRACT

A method in an industrial safety system for controlling a process or equipment, which industrial safety system includes components with safety devices. The safety system enables signals to be generated as a result of an event or alarm, where the method includes creating an automated link between the event or alarm and an effect or an action to be taken upon receipt of the event or alarm signal due to the event. The method includes configuring one or more links between the event and the input, thus forming a cause and effect matrix, and also generating a control code using the cause and effect matrix for subsequent download of the control code to at least one process controller whereby a control signal is subsequently generated by at least one safety controller to initiate the action or effect.

21 Claims, 4 Drawing Sheets

(56) References Cited

U.S. PATENT DOCUMENTS

| | | | |
|---|---|---|---|
| 7,324,856 B1 | 1/2008 | Bromley | |
| 7,684,876 B2 | 3/2010 | Grgic | |
| 2004/0193290 A1 | 9/2004 | Ott et al. | |
| 2007/0276514 A1* | 11/2007 | Martinez | G05B 23/027 700/80 |
| 2009/0276388 A1 | 11/2009 | Donohue et al. | |
| 2010/0274385 A1* | 10/2010 | Eriksson | G05B 19/4141 700/245 |
| 2010/0290084 A1* | 11/2010 | Russell, III | G05B 19/0428 358/1.15 |
| 2013/0131843 A1* | 5/2013 | Gohr | G05B 19/0421 700/80 |

OTHER PUBLICATIONS

International Search Report and Written Opinion of the International Searching Authority Application No. PCT/EP2010/059036 Completed: Jul. 27, 2011; Mailing Date: Aug. 3, 2011 14 pages.

Written Opinion of the International Preliminary Examining Authority Application No. PCT/EP2010/059036 Dated: Jun. 29, 2012 7 pages.

* cited by examiner

METHOD AND TOOL FOR AUTOMATIC DISTRIBUTION OF CONTROL CODE IN A SAFETY SYSTEM

FIELD OF THE INVENTION

The present invention relates to a method in an industrial safety system for controlling a process or equipment, which industrial safety system comprises components with inputs and safety devices, that enables signals to be generated as a result of an event or alarm. It includes a method and devices for handling events in an industrial system, such as alarms, enabling an action according to an event in an industrial system, such as an alarm or other events, and includes forming a Cause and Effect matrix and generating code based on that matrix.

BACKGROUND OF THE INVENTION

An industrial process such as an installation for extraction or production of oil and gas products has a physical implementation comprising components such as devices and apparatuses for operation, control, regulation and protection of the process. The industrial process also comprises systems for functionality, control and supervision. This results in a complex combination of system and components. In the oil and gas industry and in other process industry contexts it is necessary to protect the humans, or an individual environment, process systems, subsystems and/or components. As part of the functions of the elements in the system, measurements for parameters such as currents, voltages, phases, temperatures and so on are made substantially continuously and may result in different safety scenarios up to and even including a plant shut-down.

The safety-related functions of the industrial system are performed by a dedicated safety system with input from safety devices and safeguarding outputs. Safety systems have been developed for the purpose of enabling safeguarding actions in reaction to the safety events. Safety systems in industry have a general criterion of engineering with strong emphasis on quality and verification. Such systems are typically not fully standard but are often purpose-built and usually include various and different devices and/or subsystems, software and communication protocols.

A safety system must perform very reliably, even more reliably than the process systems they protect; this means that a different standard of engineering must be used, with stronger emphasis on quality and verification. This approach is especially important if a customer is seeking Safety Integrity Level (SIL) classification of their safety system that is according to the standards relevant for that industry or branch, e.g. IEC-61508 Functional safety of electrical/electronic/programmable electronic safety-related systems, IEC/TR3 61510 RMBK nuclear reactors-Proposals for instrumentation and control, IEC-61511 Functional safety-Safety instrumented systems for the process industry sector.

U.S. Pat. No. 5,361,198 entitled Compact work station control room and assigned to Combustion Engineering describes a concept including a safety system, comprising software, displays for input, a general safety system and hand-coded functions. US2007276514 entitled Method In A Safety System For Controlling A Process Or Equipment, and assigned to ABB, describes an industrial safety system (ISS) and methods for controlling a process or equipment. The industrial safety system includes components with safety devices and enables signals to be generated as a result of an event or alarm. An automated link is created between the event or alarm and an action to be taken upon receipt of the event or alarm signal due to the event. This is done using in part a display or HMI associated with selection means for input etc. The structure of the system is to create a grid/matrix of related objects. The grid/matrix is a system of rows and columns, an interface and type of application often referred to as a Cause and Effect matrix or diagram. This is often done by manually entering information, or importing one or more signal lists and/or cause and effect information in a worksheet or calculation sheet format, into a tool for editing a Cause and Effect matrix. The graphic user interface of the cause and effect matrix editor contains Causes arranged in horizontal rows and Effects arranged in vertical columns. A sensor device such as a level sensor provides an input signal, which is handled as a Cause. This is represented in the cause and effect matrix by a program logic component, which is a portion of control code, usually a standardized or logic component held eg in a library, which is commonly in the form of a function block, or control module or similar. This form of control code is often referred to as an intermediate code, as it is computer program code which is not yet in a compiled form.

During an engineering phase configuration is carried out with the Cause and Effect matrix editor to make a software connection between a Cause eg and an Effect. This has the effect of making a software connection between an input signal from level sensor being "software connected" to an output signal to an effect actuator for the planned event and safeguarding action. This may be thought of as resulting in the software connection of a signal path from an input device to a signal path to an output device (actuator, motor) providing the action or event. When the matrix has been configured the Cause and Effect matrix editor then converts the "software connected" for the program logic components of each cause and the program logic components of each effect and generates a IEC61311-3 control code from the matrix, usually in intermediate code. This IEC61311-3 control code may then be compiled into executable computer code and downloaded into the memory of a safety controller of a safety system.

However when generating IEC61311-3 control code from a Cause and Effect matrix, the load calculation per controller is often calculated manually by using an estimate or approximation based on the number of I/O signals and multiplying it with a factor that is related in some way to the complexity of the application. It may also be calculated using lists of the IEC61311-3 function blocks used in the control code, or other measures for entities in other types of control code, and adding up their memory values and cycle times. Then when the predicted loads have been calculated, the user can decide whether the load can be handled by a selected safety controller (or other device) or if some control code can be added or should be relocated to another safety controller. The distribution of control code over several controllers is done manually today. This process takes time, it may have results that have not been predicted, and it presents opportunities for mistakes occurring in manual inputs and manual calculations. In addition, distributing control code over several controllers creates a requirement for cross-communication between safety controllers running parts of the same control code. The safety controller cross-communication is also generally created manually.

For the emergency and process shutdown logic, shutdown levels are used. A shutdown level is a group of causes and effects, grouped together either by process sections or site areas. Process section means a specific part of the process and site area means a specific location of a site, e.g. Hazardous area, Non-hazardous area. A typical shutdown level will have a number of causes connected and will trip the effects connected to it. Ideally, all causes and effects are connected to exactly one shutdown level. All causes and effects should be connected to a shutdown level. For the Fire & Gas IEC61311-3 logic, fire areas are used. A fire area is for the fire and gas logic the equivalent to a shutdown level in for the emergency and process shutdown logic.

These shutdown levels and Fire and Gas areas are normally implemented manually within the control code. They are often part of known Cause and Effect diagram systems, however, although the control code is often generated automatically from the Cause and Effect diagram, the shutdown levels are normally not included, so that shutdown levels have to be manually added to the control code.

SUMMARY OF THE INVENTION

One aim of the present invention is to provide an improved method for automatic distribution of control code in a safety system that provides a solution to one or more of the above described problems.

According to a first aspect of the invention, a method is provided in an industrial safety system for controlling a process or equipment, said industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, configuring a representation of a safety device, and configuring a different representation of said event or alarm, configuring one or more links comprising a link between the event and the input, thus forming a cause and effect matrix, generating a control code using said cause and effect matrix for subsequent download of said control code to at least one process controller whereby a control signal is subsequently generated by at least one safety controller to initiate the action or effect, wherein the method comprises calculating a controller load for a safety controller processing said control code based on said cause and effect matrix for said at least one safety controller such that the calculated processing load is not exceeded in any safety controller.

According to another embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises calculating the controller load based at least in part on a number of program logic components comprised in said control code based on said cause and effect matrix.

According to another, further embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises accessing a program logic component of an input device or an actuator/output device effect by means of a variable comprised in said cause and effect matrix.

According to another embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises calculating the controller load based at least in part on a number of times each program logic component comprised in said control code based on said cause and effect matrix has to be executed in a given time and/or by comparing known computing performance capabilities of a process controller with information calculated dependent on the program logic components comprised in said control code based on said cause and effect matrix.

According to another embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises calculating the controller load and making the information available to a process and displaying it on a graphical user interface, where it may be edited, before generating said control code.

According to another, further embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises distributing said control code to two or more process controllers and automatically dividing the control code between them such that the calculated processing load is not exceeded in any process controller.

According to another embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises generating automatically a control code portion for cross communication between two or more process controllers running a part of said control code based on said cause and effect matrix and making the information available to a process and displaying it on a graphical user interface, where it may be edited, before generating said control code.

According to a preferred embodiment a method is provided for controlling a process or equipment in an industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, forming a cause and effect matrix, generating a control code using said cause and effect matrix for subsequent download of said control code to at least one process controller whereby a control signal is subsequently generated by at least one safety controller to initiate the action or effect, wherein the method comprises automatically generating one or more Shutdown Levels (ESD, PSD) or Fire Areas (Fire and Gas) retrieved from shutdown levels or fire areas implemented in said cause and effect matrix.

In particular, this invention applies to the automatic and semi-automatic distribution and download of cause and effect control code via a cause-and-effect matrix approach (CEM). The CEM editor is used during the design and/or engineering phases, and/or later during commissioning or maintenance/upgrades phases etc.

Preferably the cause and effect matrix is created using an editor tool for cause and effect matrices. This ensures consistent data entry methods and consistent data linking configurations. The controller-load may be calculated directly from the Cause and Effect matrix. By calculating directly from the matrix, the controller-load does not need to be calculated by entering or transferring the data to another tool. Also the controller-load may be checked more frequently or even constantly throughout the engineering process so that overloads are discovered at an earlier time.

When the processor load is calculated, the control code may be distributed over several safety controllers automatically depending on the controller load and other constraints. This has the advantage that no manual distribution needs to be done.

With the distribution of control code over several process controllers, there is a need for controller cross-communication. The necessary controller cross-communication computer program parts, or control code portions can also be generated automatically, at the time. This also provides a reduction in manual engineering effort, with an improved level of functional predictability and a reduced time for configuring.

In the improved Cause and Effect matrix disclosed here the matrix includes a cause which is represented by a global variable and an effect which is represented by another, different global variable. Thus each cause input and each effect output are identified and represented in the matrix not in the form of a function block or other process logic component representing the device/function but in the form of a global variable <cause-name>_<cause-type>. This has the advantage, compared to the prior art intermediate code component/function block method that manual control code can be added in between the input device and the global variable, thus making the CEM editor more adaptable to the requirements of the safety system or of distribution between various safety controllers.

Because shutdown levels are normally entered and/or configured in the cause and effect diagram, the respective shutdown levels required for the control code may also be created automatically with the help of a Cause and Effect Editor tool. The Cause and Effect Editor tool which in general is a control code engineering tool may be an application such as the Control Builder M product or Advant Safety Builder product supplied by ABB with ABB Safeguard Systems. The control code engineering tool accepts a cause and effect matrix as input and transforms it into control code. The control code may be in a form compatible with any of the intermediate code types named in standard IEC 61131-3.

The control code is preferably first compiled into executable/binary code that can be executed in the safety controller, and then downloaded into a process controller (or other safety device) as executable/binary code.

The generated control code can also be structured according to the shutdown levels, and/or Fire Areas or FGS detection/mitigation factors and/or also to other logical constraints.

Another advantage of the invention is that the resulting complete safety system can be more fully tested earlier in the product development cycle.

The control code generated from a Cause and Effect matrix can be distributed over controllers, applications or other safety units automatically according to information from the Cause and Effect matrix and other rules or constraints. With the data from a Cause and Effect matrix or diagram, the controller-load can be calculated and thus may be applied as a constraint for the distribution. Also the cross-communication control code portions between controllers and/or applications can be automatically generated and in addition can be minimized to achieve a more efficient control code distribution.

The Cause and Effect matrix and the control code generated from it may be applied to one or more controllers in a safety system of a hazardous installation with a process from any process industry group such as: oil and gas extraction, production, refining, transport, distribution; chemical process, pharmaceutical process, process in an installation for production or processing of pulp and paper.

In another aspect of the invention, a cause and effect editor tool for manipulating a cause and effect matrix for controlling a process or equipment in an industrial safety system is disclosed, the industrial safety system comprising components with inputs and safety devices enabling signals to be generated as a result of an event or alarm, comprising a graphic user interface for creating an automated link between the event or alarm and an effect or an action to be taken upon receipt of said event or alarm signal due to the event forming a cause and effect matrix, and the industrial safety system comprising a software and/or hardware tool (CBM) for generating a control code using said cause and effect matrix, and downloading said control code to at least one safety controller, the system comprising a computer, a computer program and a graphical user interface, wherein the said cause and effect editor tool comprises a calculation device for calculating a controller load for a safety controller processing said control code based on said cause and effect matrix prior to distributing said control code to said at least one safety controller such that the calculated processing load is not exceeded in any process controller.

In another aspect of the invention, a computer program is described for carrying out the methods according to the invention. In another aspect of the invention a computer program product comprising a computer program for carrying out the method of the invention is described.

In another, further aspect of the invention, a graphical user interface is described for displaying safety data for the one or more of the apparatuses so protected; and further for providing, in response to user input at the graphical user interface, access through the graphical user interface to any of the devices and their signals or events, or actuators and their effects, actions which are ordered by the "software connections" linked in or otherwise included in the cause and effect matrix.

BRIEF DESCRIPTION OF THE DRAWINGS

A more complete understanding of the method and system of the present invention may be had by reference to the following detailed description when taken in conjunction with the accompanying drawings which, schematically and only by way of a non-restrictive illustration, represent a practical embodiment of the invention. In the drawings.

DETAILED DESCRIPTION OF THE INVENTION

Figure 1:
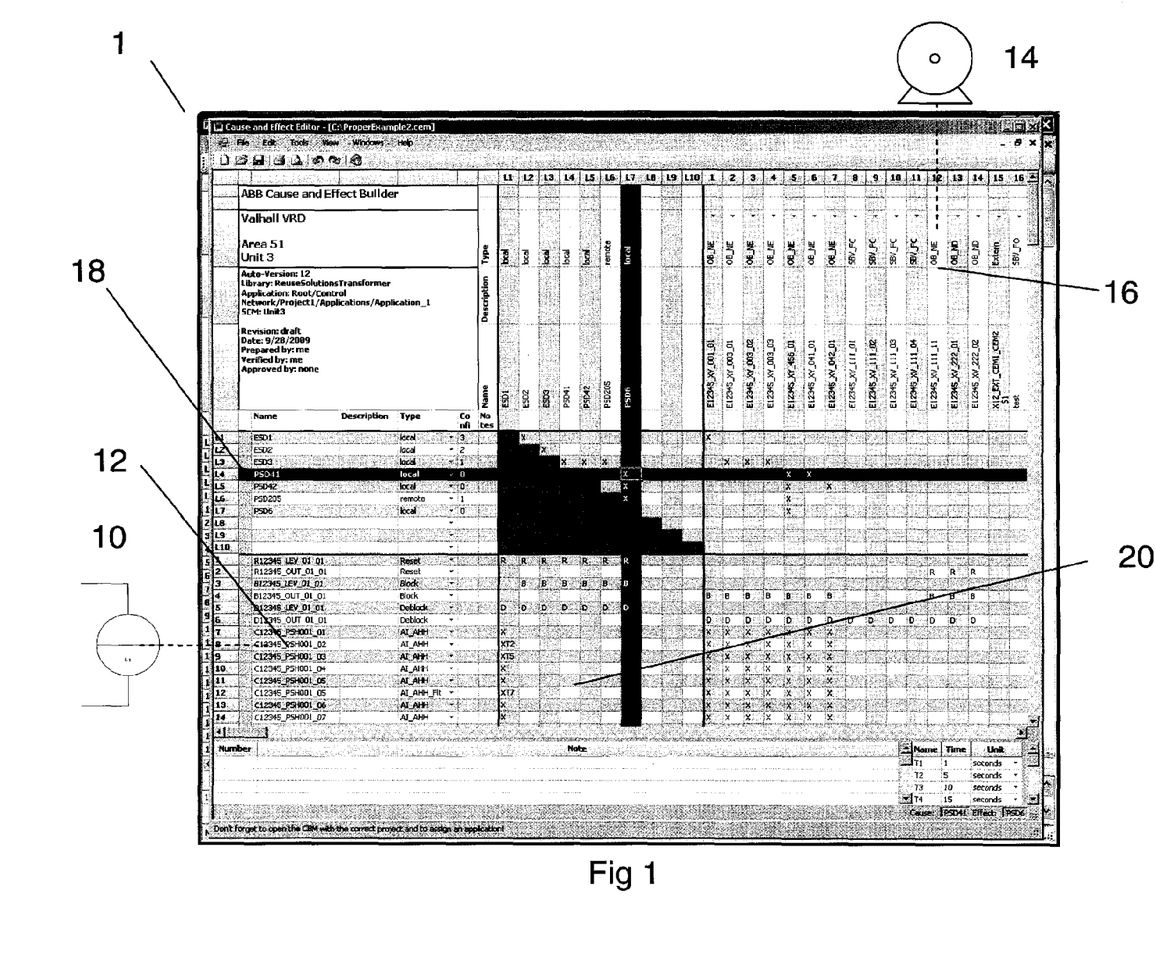
FIG. 1 shows in a simplified block diagram a graphic user interface displaying a cause and effect matrix inside a cause and effect editor according to an embodiment of the invention.

FIG. 1 shows elements of a graphical user interface of a cause and effect matrix in an industrial control system in a simplified diagram. Within an industrial control system the safety system is comprised in the control system and functions as an individual system in parallel with the control system, sometimes even enabling the same action, but with different decision chains.

A preferred embodiment of a user interface of the cause and effect editor tool comprises a cause and effect matrix (CEM). The cause and effect editor may be displayed on a suitable workstation display device and arranged with selection means for input etc. to a human machine interface (HMI). The cause and effect matrix has horizontal rows of causes and vertical columns of effects. The matrix includes a cause which is represented by a global variable and an effect which is represented by another, different global variable. Thus each cause input and each effect output are identified and represented in the matrix not in the form of a function block or other process logic component but in the form of a global variable. This is preferably of the form "<cause-name>_<cause-type>" (in the case of "causes"). The global variable in the case of effects is preferably of the form "<effect-name>_<effect-type>".

Thus the Cause and Effect matrix presented in the graphical user interface contains only a number of uniquely identified global variables. Each of which global variable, in effect, acts as a link to a process logic component representing each different input device or different output device. Thus the intermediate code that represents the cause input device or the effect output device is not present in the matrix, in contrast to known systems. The advantage of this improvement is that the cause and effect matrix itself does not include code to model the particular cause or the effect but instead a global variable, which provides an added flexibility to the user because adaptations may be made. A user can manually add other parameters or other code inserted between the input and output program logic components separately from the cause and effect matrix.

The matrix has a group of levels or areas within the process. A shutdown level is a group of causes and effects, grouped together either by process sections or site areas. Each level is denoted by a name or signal name or tag such as ESD1, ESD2, ESD3, PSD42; PSD205 and so on. The level type in the examples is denoted as either Local or Remote. Each level name ESD1, PSD42 etc denotes a part of the process.

Figure 2:
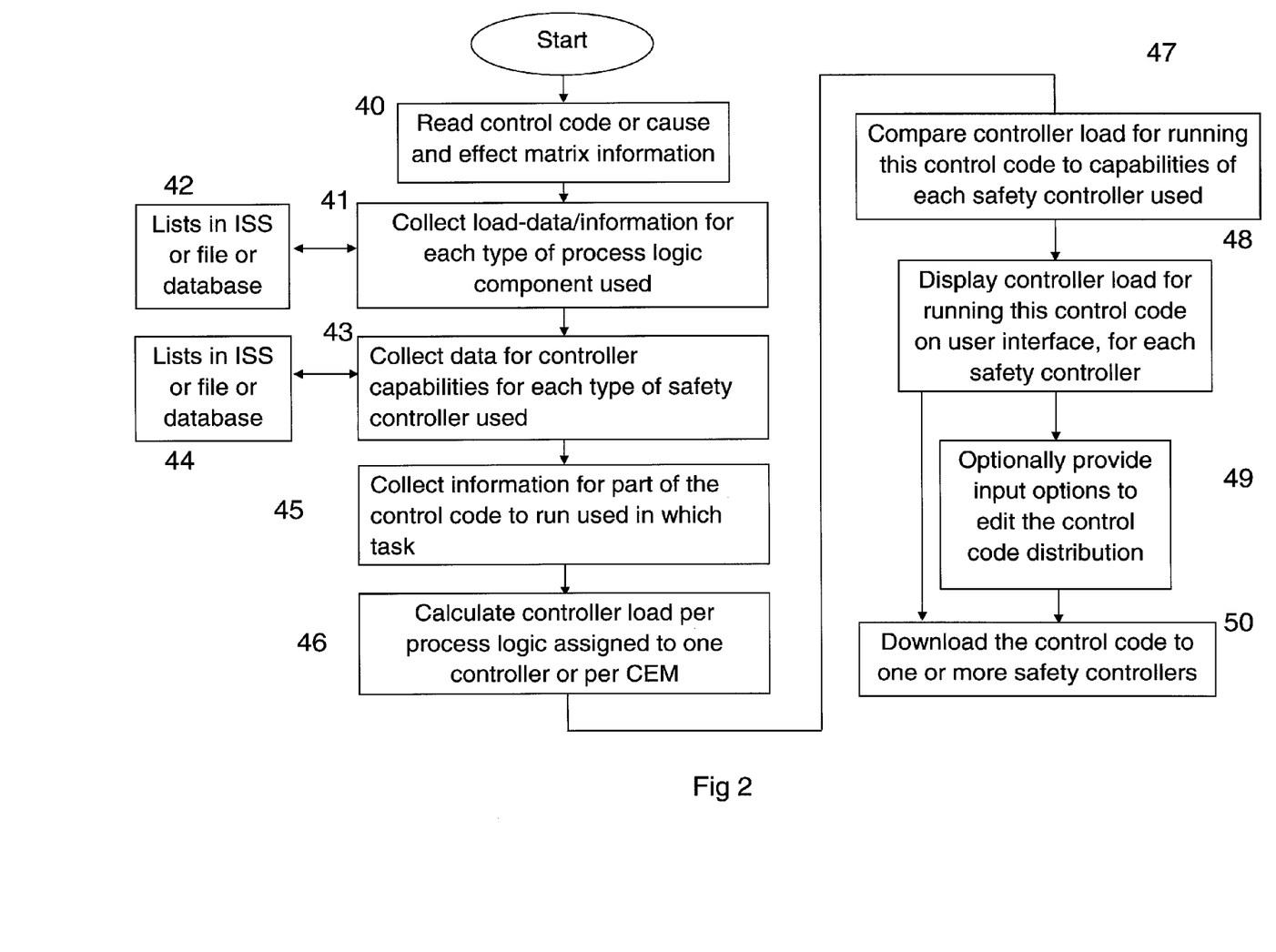
FIG. 2 shows the invention of FIG. 1 and more particular is a flowchart showing a method for carrying out the invention of FIG. 1.
Figure 3:
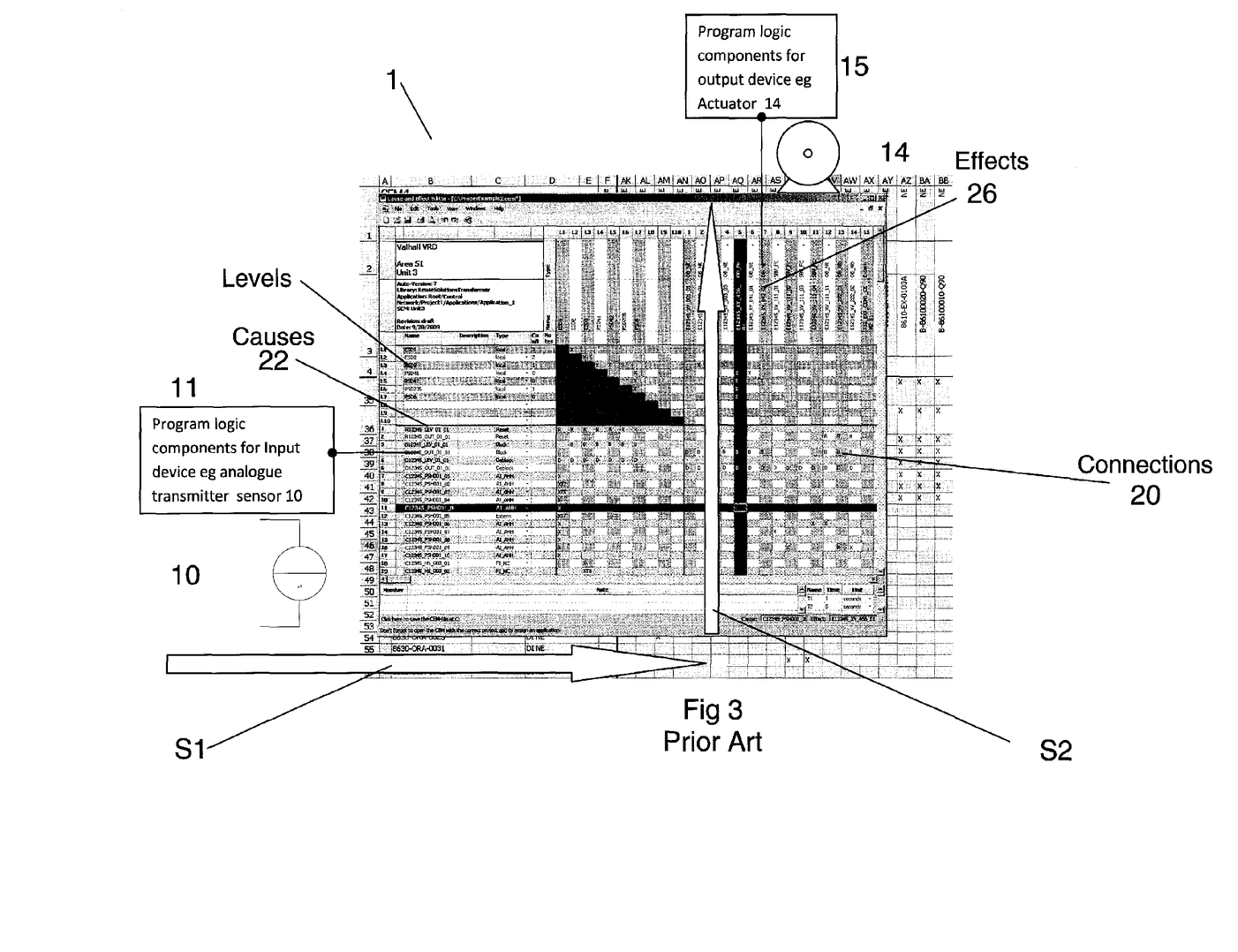
FIG. 3 (Prior Art) is a known type of cause and effect matrix.

A method to calculate a processor load that the control code—automatically generated from the Cause and Effect matrix—would cause when run on a process controller will now be described. The method includes the action of presenting on a graphical user interface a value for the control load for a given cause and effect matrix before that control code is downloaded for use in a safety process controller. This allows for an engineer to examine and optimize processor load, and also to determine if the control code shall be divided and downloaded into two or more safety controllers.

The flowchart shows the method to comprise:

Read control code or cause and effect matrix information—either the control code that would be generated from the current cause and effect matrix is used as input or the cause and effect matrix information directly;

Collect data for each type of process logic component used—data such as how much processor memory is used or the execution time (resulting in how much cyclic load is contributed depending on the cycle time chosen) by each type of process logic component;

Optionally retrieve performance-related process logic component data from a list or from lists held in the safety system ISS or the industrial control system;

Collect data for controller capabilities for each type of process controller used—such as total or available RAM or a performance factor;

Optionally retrieve performance-related data for the processor of the safety controller from a list or from lists held in the safety system ISS or the industrial control system;

Retrieve information about which pieces of the control code should run in which task. (For example: every piece of control module is executed once per cycle. The control code is assigned to one or more tasks of a certain cycle time. The cycle time can be e.g. 1000 ms or 250 ms. A controller can have several tasks.)

Calculate memory usage and cyclic load per CEM (or per process controller used in that CEM if the causes/effects are assigned to different controllers);

Compare controller load for running this control code for each process controller to be used—compare the calculated controller load to the performance capabilities of the specific type of (process or safety) controller;

Display controller load for running this control code for each process controller on user interface; display the resulting controller load on interface before downloading the control code to the safety controller;

Optionally provide input options to edit, or download the control code to one or more process or safety controllers—provide engineer/user with display and options to accept or change the control code distribution or re-run the load calculation Download control code—download the control code resulting from a cause and effect matrix or parts of it to one or more safety controllers.

Preferably information about the data for each type of process logic component used and how much processor memory is used by each type of process logic component, and other processor performance factors such as the cycle-time (how often they are executed), can be made available to the Cause and Effect editor tool by the industrial control system or ISS, especially from a system called 800xA supplied by ABB. Alternatively or as well some or all of process logic component data may be available from the Control Builder M application an ABB engineering tool.

Figure 4:
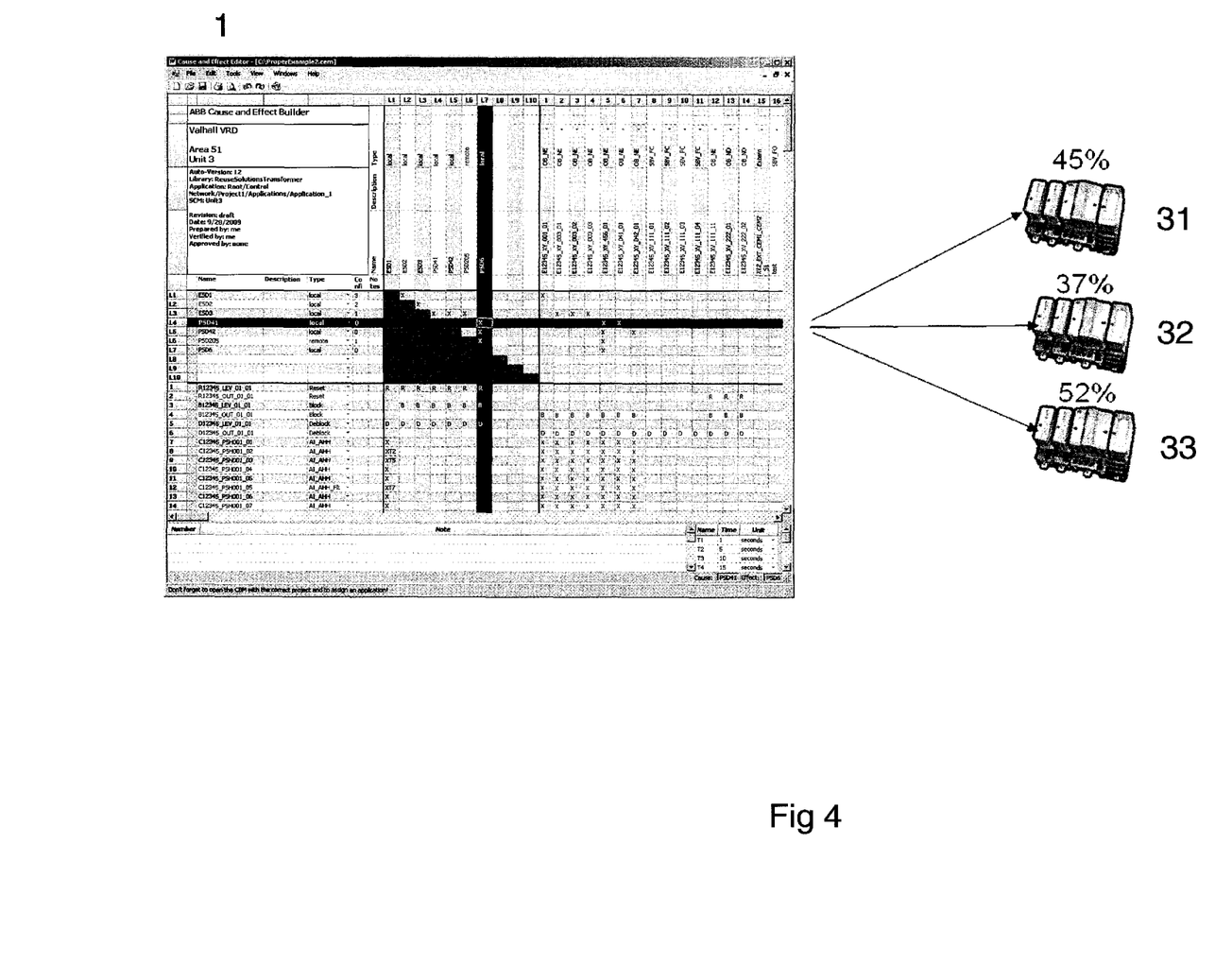
FIG. 4 shows the invention of FIG. 1 and more particularly illustrates the distribution of control code from a cause and effect matrix over a number of safety controllers according to an embodiment of the invention.

The control code may be automatically divided up by the Cause and Effect editor so that controller load does not exceed capabilities of a process controller. It may also be divided up to optimize the operation of one or more safety controllers. While generating control code from a cause and effect matrix, the control logic can be distributed over several controllers automatically depending on the load of each controller and/or other constraints.

The control logic can be distributed in the form of control code over several controllers subject to different conditions or constraints. The user could enter rules into the matrix on how he wants the code to be distributed. For example to include functional or mechanical redundancy, two pumps or valves that fulfill an important shutdown function should not be operated by the same physical safety controller. A rule could be set that each one of such two devices is controlled by a different safety controller.

Another approach to optimizing a control code distribution is for the editor tool to provide functions and selections such that the user can select and pre-allocate parts of the Cause and Effect Diagram manually and that the tool then allocates the rest of it automatic according to controller load, cross-controller communication or other criteria.

To give the user a feedback on "how well" his pre-allocation works, the tool could display e.g. the needed amount of cross-communication resulting from the optimization. This may be calculated and displayed before the control code is generated, distributed in that way, and downloaded into the one or more safety controllers.

There is more than one way to implement the split of a large matrix so that the control code ends up in different controllers. The preferred method is to split the huge matrix into smaller matrixes, each of them corresponding to one controller. This method has the advantage that is often easier for a user to understand what is present in each set of control code. Usually the tool (CBM) compiles the code and loads it into the controller so that there is always a step in between generating the control code and downloading the code.

An alternative method is to generate control code directly from the large matrix (without splitting it up into smaller matrices first). Subsequently the resulting code from the large matrix is divided up over one or more safety controllers and downloaded.

With the distribution of one Cause and Effect Matrix over several controllers, there is a need for controller-cross-communication that then can be generated automatically according to the split. As the controller-cross-communication is generated directly from the Cause and Effect diagram, it will always be up to date with the distribution of the logic configured in the Cause and Effect Matrix among the controllers. This results in a reduced requirement for manual engineering effort. As mentioned above, the amount of controller cross-communication required by any particular distribution of a specific control code may be calculated and displayed in advance of actually generating, distributing and downloading the control code to the controllers.

Preferably the control code is compiled before downloading to one or more selected safety controllers.

For the emergency shutdown and process shutdown logic, shutdown levels are used, and these levels are normally implemented manually within the control code in known cause and effect matrices. However shutdown levels are most often included in part of the Cause and Effect diagram. In known systems as soon as the control code is generated automatically from the Cause and Effect diagram, the shutdown levels are not included. According to another embodiment of the present invention, control code is generated using the cause and effect builder tool that includes the shutdown level information. Thus the resulting control code includes shutdown levels which no longer need to be entered manually after generation.

In another embodiment instead of saving the cause and effect diagram as an Excel-sheet or in a database, it is saved in an XML-format. By this means the data can be exchanged more easily among different tools. It can also be stored independently of any Excel or database version and can also be stored very compactly when the XML file has been compacted (e.g. zipped). The XML file can also be made system-wide accessible within an industrial control system so that the Cause and Effect Diagram can be planned from any engineering node in the system and not only from one where it was initially created. There is no need to manually copy the file to another node (PC). In an industrial control system such as the 800xA system from ABB, this can be achieved by placing the cause and effect data in an aspect.

Another embodiment of the safety system includes display devices with sensitive screen materials, touch screens and the like. Touch screens may be arranged to register a touch or a near movement or gesture by electrical (eg capacitive) functions or by optical functions (eg IR registration, refraction in screen material due to a function of touch pressure) and so on.

In the case where the HMI of the safety system is embodied as a touch screen, text lines or images included in the display of the preferred embodiment, and the select, navigation buttons may each be embodied as images on a touch screen. Monitoring of the operations of one or more of process devices protected by a safety means may be carried out according to the same method but executed by means of touching parts of the screen instead of pressing buttons, or by clicking with a computer mouse or other pointing/selection device. The HMI may be arranged so that two or more user inputs may be received simultaneously either using a single mode, such as a multi-touch screen or by using a plurality of modes such as single screen touch+mouse pointer, single screen touch+computer mouse left-click/right-click or single screen touch+CTRL or other keyboard key. In a particular improvement to facilitate collaboration the Cause and Effect editor graphic user interface may for example be displayed on a collaboration display device such as a horizontal table-like surface around which a number of users may collaborate and operate input devices simultaneously when configuring or testing safety inputs and effects for a safety system.

This invention is applicable in all industrial areas where safety systems are mandated and other areas where introducing mandatory safety system is under discussion.

Methods of the invention may be supervised, controlled or carried out by one or more computer programs. One or more microprocessors (or processors or computers) comprise a central processing unit CPU connected to or comprised in a safety controller or process controller as described, which processors, PLCs or computers perform the steps of the methods according to one or more aspects of the invention. It is to be understood that the computer programs for carrying out methods according to the invention may also be run on one or more general purpose industrial microprocessors or PLCs or computers instead of one or more specially adapted computers or processors.

The computer program comprises computer program code elements or software code portions that make the computer or processor perform the methods using equations, algorithms, data, stored values, calculations, synchronisations and the like for the methods previously described, and for example in relation to the flowchart of FIG. 2. A part of the program may be stored in a processor as above, but also in a ROM, RAM, PROM, EPROM or EEPROM chip or similar memory means. Some of the programs in part or in whole may also be stored locally (or centrally) on, or in, other suitable computer readable medium such as a magnetic disk, CD-ROM or DVD disk, hard disk, magneto-optical memory storage means, in volatile memory, in flash memory, as firmware, or stored on a data server. Other known and suitable media, including removable memory media such as Sony memory stick™, a USB memory stick and other removable flash memories, hard drives etc. may also be used. The program may also in part be supplied or updated from a data network, including a public network such as the Internet.

It should be noted that while the above describes exemplifying embodiments of the invention, there are several variations and modifications which may be made to the disclosed solution, and in particular to the method for calculating processor loads, without departing from the scope of the present invention as defined in the appended claims.

What is claimed is:

1. A method in an industrial safety system for controlling a process or equipment, said industrial safety system comprising components with safety devices and wherein said safety system enables signals to be generated as a result of an event or alarm, the method comprising
creating an automated link between the event or alarm and an effect or an action to be taken upon receipt of said event or alarm signal due to the event,
configuring a representation of a safety device, and configuring a different representation of said event or alarm,
configuring one or more links comprising a link between the event and the input, thus forming a cause and effect matrix,
generating a control code using said cause and effect matrix for subsequent download of said control code to safety controllers whereby a control signal is subsequently generated by at least one safety controller to initiate the action or effect, characterized by
calculating a controller load for a safety controller processing said control code based on said cause and effect matrix for said at least one safety controller such that the calculated controller load is not exceeded in any safety controller, and by
automatically dividing the control code between two or more safety controllers by dividing up said cause and effect matrix first into smaller matrices, generating a plurality of said control code, and distributing each of the plurality of said control code from each smaller matrix to each of the two or more safety controllers.

2. The method according to claim 1, characterized by calculating the controller load based at least in part on a number of program logic components comprised in said control code based on said cause and effect matrix.

3. The method according to claim 2, characterized by accessing a program logic component of an input device or an actuator/output device effect by means of a variable comprised said cause and effect matrix.

4. The method according to claim 1, characterized by calculating the controller load based at least in part on a number of times each program logic component comprised in said control code based on said cause and effect matrix has to be executed in a given time.

5. The method according to claim 1, characterized by calculating the controller load by comparing known computing performance capabilities of a safety controller with information calculated dependent on the program logic components comprised in said control code based on said cause and effect matrix.

6. The method according to claim 1, characterized by calculating the controller load based on information about the program logic components comprised in said cause and effect matrix, and other code system load values for connecting two or more of the program logic components stored in a part of the industrial safety system.

7. The method according to claim 1, characterized by calculating the controller load and making the information available to a process and displaying it on a graphical user interface before generating said control code.

8. The method according to claim 1, characterized by distributing said control code to two or more safety controllers and automatically dividing the control code between them such that the calculated processing load is not exceeded in any safety controller.

9. The method according to claim 7, characterized by generating automatically a control code portion for cross communication between two or more safety controllers running a part of said control code based on said cause and effect matrix which schedule is formed dependent on the division of said control code.

10. The method according to claim 1, characterized by generating automatically a control code portion for cross communication between two or more safety controllers running a part of said control code based on said cause and effect matrix and making the information available to a process and displaying it on a graphical user interface before generating said control code.

11. The method according to claim 1, characterized by a further action after calculating controller load, and before distributing said control code to said safety controllers, of compiling said control code into executable code and downloading it to at least one safety controller.

12. The method according to claim 1, characterized by automatically generating one or more Shutdown Levels or Fire Areas retrieved from shutdown levels or fire areas implemented in said cause and effect matrix.

13. The method according to claim 1, characterized by each of the smaller matrices corresponding to a safety controller.

14. The method according to claim 1, characterized by a safety controller calculating the processor load using control code generated from the cause and effect matrix.

15. An industrial safety system comprising
components with inputs and safety devices enabling signals to be generated as a result of an event or alarm, comprising a graphic user interface for creating an automated link between the event or alarm and an effect or an action to be taken upon receipt of said event or alarm signal due to the event forming a cause and effect matrix, and comprising a cause and effect editor tool for generating a control code using said cause and effect matrix, arranged for downloading said control code to at least one safety controller, the system comprising a computer, a computer program and a graphical user interface, characterized in that the cause and effect editor tool comprises a calculator for calculating a controller load for a safety controller based on said cause and effect matrix and subsequently distributing said control code to said at least one safety controller such that the calculated controller load is not exceeded in any safety controller, and in that the cause and effect editor tool automatically can divide the control code between two or more safety controllers by dividing up said cause and effect matrix first into smaller matrices, generating a plurality of said control code, and distributing each of the plurality of said control code from each smaller matrix to each of the two or more safety controllers.

16. The system according to claim 15, characterized by further comprising a hand-held computing device displaying said graphical user interface, arranged with controls for input by one or more users to said graphical user interface.

17. The system according to claim 15, characterized in that the hand-held computing device is equipped with a wireless receiver and/or transmitter.

18. The system according to claim 16, characterized in that the hand-held computing device is equipped with controls for input by one or more users to said graphical user interface and for accessing a functioning faceplate representation for any device configured in or linked to said cause and effect matrix.

19. A computer-readable non-transitory medium encoded with a computer program for controlling safety devices in an industrial safety system, said program comprising computer code and/or computer software means which, when fed into a computer, will make the computer carry out a method in an industrial safety system for controlling a process or equipment, said industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, configuring a representation of a safety device, and configuring a different representation of said event or alarm, configuring one or more links comprising a link between the event and the input, thus forming a cause and effect matrix, generating a control code using said cause and effect matrix for subsequent download of said control code to safety controllers whereby a control signal is subsequently generated by at least one safety controller to initiate the action or effect, characterized by calculating a controller load for a safety controller processing said control code based on said cause and effect matrix for said at least one safety controller such that the calculated controller load is not exceeded in any safety controller, and by automatically dividing the control code between two or more safety controllers by dividing up said cause and effect matrix first into smaller matrices, generating a plurality of said control code, and distributing each of the plurality of said control code from each smaller matrix to each of the two or more safety controllers.

20. A computer or processor having a computer program executing thereon to cause the computer or processor to carry out a method in an industrial safety system for controlling a process or equipment, said industrial safety system comprising components with safety devices and wherein said safety system enables signals to be generated as a result of an event or alarm, the method comprising creating an automated link between the event or alarm and an effect or an action to be taken upon receipt of said event or alarm signal due to the event, configuring a representation of a safety device, and configuring a different representation of said event or alarm, configuring one or more links comprising a link between the event and the input, thus forming a cause and effect matrix, generating a control code using said cause and effect matrix for subsequent download of said control code to safety controllers whereby a control signal is subsequently generated by at least one safety controller to initiate the action or effect, characterized by calculating a controller load for a safety controller processing said control code based on said cause and effect matrix for said at least one safety controller such that the calculated controller load is not exceeded in any safety controller, and by automatically dividing the control code between two or more safety controllers by dividing up said cause and effect matrix first into smaller matrices, generating a plurality of said control code, and distributing each of the plurality of said control code from each smaller matrix to each of the two or more safety controllers.

21. Use of a system for controlling a process or equipment in an industrial safety system for the purpose of automatically generating control code, compiling that control code and downloading the resultant executable control code to one or more controllers in a safety system of a hazardous installation with a process from the process industry group of: oil and gas extraction, production, refining, transport, distribution; chemical process, pharmaceutical process, process in an installation for production or processing of pulp and paper, the system comprising components with inputs and safety devices enabling signals to be generated as a result of an event or alarm, comprising a graphic user interface for creating an automated link between the event or alarm and an effect or an action to be taken upon receipt of said event or alarm signal due to the event forming a cause and effect matrix, and comprising a cause and effect editor tool for generating a control code using said cause and effect matrix, arranged for downloading said control code to at least one safety controller, the system comprising a computer, a computer program and a graphical user interface, characterized in that the cause and effect editor tool comprises a calculator for calculating a controller load for a safety controller based on said cause and effect matrix and subsequently distributing said control code to said at least one safety controller such that the calculated controller load is not exceeded in any safety controller, and in that the cause and effect editor tool automatically can divide the control code between two or more safety controllers by dividing up said cause and effect matrix first into smaller matrices, generating a plurality of said control code, and distributing each of the plurality of said control code from each smaller matrix to each of the two or more safety controllers.

* * * * *